Patented Jan. 10, 1939

2,143,023

UNITED STATES PATENT OFFICE 2,143,023

PROTEIN DERIVATIVE

Frederick M. Meigs, Wilmington, Del., assignor to E. I. du Pont de Nemours & Company, Wilmington, Del., a corporation of Delaware No Drawing. Application January 17, 1936, Serial No. 59,643. In Germany June 18, 1935

21 Claims. (Cl. 134—20)

This invention relates to new and improved protein derivatives, more particularly basic protein derivatives which are for the most part acid-soluble, and to a process for the preparation thereof.

It is an object of the invention to produce new and improved protein derivatives. Another object is the production of high molecular weight basic compounds. A further object is the preparation of acid-soluble protein derivatives and acid addition products or salts thereof, which have very useful characteristics. A still further object is the provision of a new and improved process for the preparation of such products. An additional object is the provision of a process for effecting the combination of proteins with methylolamines to produce polymeric basic compounds from such proteins. A further and more specific object is the preparation of polymeric basic derivatives of zein, the protein occurring in corn. Other objects will appear hereinafter.

These objects are accomplished in accordance with the present invention by reacting a protein, preferably dissolved or suspended in a suitable solvent, with a lower aliphatic aldehyde or ketone, preferably one containing less than five carbon atoms, and an amine of less than nine carbon atoms in which at least one amino-nitrogen has attached thereto at least one hydrogen atom, i. e., primary or secondary amines which are preferably aliphatic. Such products, with possibly a few isolated exceptions, are readily soluble in dilute aqueous acids such as acetic, and these acid solutions may be considered as aqueous solutions of the acid salt of the basic protein derivative. The basic protein derivatives are also characterized by their greater solubility in alcohol than the original protein.

The invention will be further understood, but is not limited, by the following examples.

Example I

To a solution of 220 cc. of formaline (37% aqueous formaldehyde) containing 1 gram of potassium carbonate, there was added 250 cc. of piperidine while the mixture was cooled with tap water. This methylol-piperidine solution was then added to a mixture of 1500 cc. of methanol, 75 cc. of water and 250 grams of zein. The solution was mixed thoroughly with mechanical agitation and allowed to stand overnight. It was centrifuged to remove insoluble materials and then concentrated in vacuo. The concentrated solution was poured into a large volume of water which resulted in the precipitation of the reaction product. This was washed several times by decantation and was finally pressed out and dried as rapidly as possible with the aid of a hot air blast and an oven at 50° C. The material was ground to a fine powder as soon as it was dry, the yield of piperidyl-methyl zein being 239 grams. This material was readily soluble in dilute aqueous acetic acid.

Example II

A mixture containing 3 liters of alcohol, 200 cc. of water, 220 cc. of formalin, 250 cc. of piperidine and 500 grams of zein was stirred and heated at 80° C. for six hours. The mixture was allowed to stand overnight and was then precipitated by pouring into 30 liters of water. The reaction product was washed, dried and ground. A yield of 472 grams of piperidyl-methyl zein was obtained, which product was soluble in absolute alcohol, alcohol-benzene mixtures, and in the stoichiometrical amount or more of dilute aqueous acids, such as acetic, whose concentration is, for example, in the range 1–10%. Hard, tough films may be obtained from both alcohol and acid solutions, the films in both instances preferably being dried at elevated temperatures.

Example III

A suspension of 500 grams of zein in 500 cc. of methylol-dimethylamine (prepared from formaldehyde and dimethylamine) and 3.5 liters of water was stirred and allowed to stand at 25°–30° C. for a period of two days. The mixture became very viscous and sticky, and the solid material was separated by centrifugation. The product was dried directly by means of a hot air blast and oven at 50° C. There was thus obtained 384 grams of dimethylaminomethyl zein which was readily soluble in 1.5% aqueous acetic acid.

Example IV

A solution of diethylaminomethanol was prepared by adding 73 grams of diethylamine to 88 cc. of formalin containing a small amount of potassium carbonate, the temperature being kept low by cooling with tap water. This solution was then added to 600 cc. of methanol, 30 cc. of water and 100 grams of zein. The resulting mixture was stirred thoroughly with mechanical agitation and allowed to stand at 25°–30° C. overnight. The solution was then filtered with a pressure filter and concentrated in vacuo to a thick sirup. This was poured into water which resulted in the precipitation of the diethylaminomethyl zein, which was washed and dried as in Example I, the yield being 70 grams. This material was readily soluble in 1.5% aqueous acetic acid.

Example V

A mixture of 132 grams of zein, 92 grams of dibutylamine, 58 cc. of formalin, 800 cc. of alcohol and 36 cc. of water was allowed to stand overnight at room temperature and then heated at 80° C. for six hours. The cold mixture was then precipitated by pouring it slowly into six volumes of cold water. The product precipitated readily and was washed with water several times and dried. A yield of 165 grams of dibutylaminomethyl zein was obtained, which product was soluble in 3% aqueous acetic acid, alcohol and in alcohol-benzene mixtures.

Example VI

The methylol derivative of cyclohexylethylamine was prepared by adding 65 grams of this secondary amine to 44 cc. of formalin containing a small amount of potassium carbonate. The resulting solution was added to 50 grams of zein in 300 cc. of methanol and 15 cc. of water. The resulting mixture was stirred thoroughly and allowed to stand at 25°–30° C. overnight. Methanol was then removed by distillation in vacuo until a thick sirup was obtained. This sirup was poured into water, and the cyclohexylethylaminomethyl zein which precipitated was separated, washed and dried. It was soluble in alcohol-benzene mixtures.

Example VII

The use of a polyamine may be illustrated as follows: Ten (10) grams of piperazine, 17 cc. of formalin, 100 cc. of ethanol and 20 grams of zein were allowed to stand overnight at 25°–30° C. and then heated on a steam bath at 70°–80° C. for about three hours. Since the action of a bifunctional derivative results in cross-linking with the eventual insolubilization of the material, the progress of the reaction was followed by testing small samples for their acid-solubility and the reaction was stopped before the material became insoluble in acid solution. The product was precipitated in water, washed several times with water and dried, and was found to be soluble in dilute acetic acid. The yield was about 24 grams.

Example VIII

Fifty (50) grams of glycinin (soya bean protein) were dissolved in 400 cc. of water and 15 cc. of piperidine. To this solution there were added 50 cc. of piperidine and 44 cc. of formalin. A heavy emulsion resulted which was allowed to stand overnight at room temperature and was then heated on a steam bath for several hours. The piperidyl-methyl glycinin thus formed was readily soluble in both dilute aqueous acids and alkalis. The solubility in alkali is a characteristic of the original protein which has been retained.

Example IX

A mixture of 300 cc. of water, 50 cc. of methyloldimethylamine (from formaldehyde and dimethylamine), 100 cc. of alcohol and 50 grams of gliadin (wheat protein) was stirred vigorously and allowed to stand at 25°–30° C. for three days. The dimethylaminomethyl gliadin which was thus formed as a thin paste was soluble, when freshly prepared, in aqueous solutions of both acids and alkalis.

Example X

Methylenedimethylamine, a compound of the formula $(CH_3)_2N-CH_2-N(CH_3)_2$, was prepared by treating formalin with a large excess of dimethylamine. Thus, 88 cc. of formalin, cooled to 25° C., was treated with 100 grams of dimethylamine while the temperature was maintained below 25° C. To 120 cc. of this methylenedimethylamine solution, which contained about 0.5 moles of the methylenedimethylamine, there were added 1000 cc. of water and 50 grams of casein. On stirring, the casein dissolved completely and, after standing for one day at 25°–30° C., the dimethylaminomethyl casein which was formed was soluble in 1.5% aqueous acetic acid as well as in dilute alkali.

Example XI

The preparation of dialkylaminoproteins by the use of a non-solvent may be illustrated as follows: A suspension of 50 grams of zein in 500 cc. of benzene and 30 grams of methylol-piperidine was refluxed for about three hours. The product was filtered, washed with benzene, and dried. The yield of piperidyl-methyl zein was practically quantitative, which material was soluble in dilute acids.

Example XII

Thirty-two (32) cc. of a 14.3% aqueous solution of monoethylamine was treated with 20 cc. of formalin, whereby dimethylolethylamine was produced. Ten (10) grams of zein and 75 cc. of alcohol were added to the above solution, and the mixture was heated on the steam bath at 70°–80° C. for four hours. The heating should be discontinued before the reaction product becomes insoluble in dilute acetic acid. The product was precipitated by pouring into water, washed several times with water, and dried. A yield of 7 grams of material soluble in 2.0% aqueous acetic acid was obtained.

Proteins suitable for use in this invention include a wide variety of substances such as gelatin, albumin, globin from blood, zein from corn, hordein from barley or rye, legumin from vetch or peas, edestin from cottonseed or hempseed, gliadin from wheat, glycinin from the soya bean, proteins from peanuts, and generally such proteins as are classified as albumins, globulins, glutelins, prolamines and certain conjugated proteins such as the phosphoprotein, casein. Difficultly soluble proteins such as keratin should preferably first be slightly degraded by means of alkali or alkali earth hydroxides, sulfides or hydrosulfides. The preferred proteins are those which give on hydrolysis aspartic acid and/or glutamic acid and/or arginine and/or lysine in an amount or aggregate amount equal to or above 10% of the total amino-acid content of the protein; examples of such proteins are gelatin, casein, zein, gliadin, edestin, and glycinin.

In carrying out this invention, there may be used any amine having less than nine carbon atoms in which at least one amino-nitrogen has attached thereto at least one hydrogen atom and in which all amino-nitrogens are attached to aliphatic carbons only. Thus, there may be used symmetrical or unsymmetrical aliphatic secondary amines such as dimethylamine, diethylamine, dipropylamine, dibutylamine, ethylmethylamine, methylpropylamine, butylethylamine, amylethylamine, butylpropylamine, etc., as well as cyclic secondary amines such as pyrrolidine, piperidine, hexamethyleneimine, morpholine and the cyclic secondary diamines, piperazine and tetramethylpiperazine. Other polyamines such as ethylenediamine, diethylenetriamine and triethylenetetramine may also be used in this process. Amines having alcoholic hydroxyls may also be employed such as glucamine, methylglucamine, ethanol-amine and diethanolamine. Other primary amines, in addition to those mentioned, which may be used are methylamine, butylamine, isobutylamine, amylamines, or mixtures thereof with each other or with secondary amines. Amines having aromatic nuclei may also be used provided the amino-nitrogen is attached to aliphatic carbons, examples of such amines being benzylamine, xylylenediamines, beta-phenylethylamine, and homologues thereof.

When the process is carried out using a protein which is sensitive to formaldehyde, for example, with casein or gelatin, the hardening of the protein may be avoided by first preparing an intermediate compound from the amine and aldehyde or ketone, prior to reaction with the protein. For example, by the reaction of two moles of a dialkylamine with one mole of formaldehyde, an intermediate methylene-amine is formed (see Example X). These compounds are sufficiently stable to inhibit the action of formaldehyde on the protein but are sufficiently reactive so that the final product, a dialkylaminomethyl protein, is formed which possesses the same general structure as that obtained from the dialkylaminomethanol derivative. Alternatively, the action of formaldehyde may be inhibited by the use of other agents which react with methylolamines, such as urea or formamide.

While in the examples formalin solution (37% formaldehyde in water) has ordinarily been used, it is understood that any form of formaldehyde such as gaseous formaldehyde, paraformaldehyde or trioxymethylene may be employed. When polymeric formaldehyde such as paraformaldehyde is used, the addition of a small amount of alkali to the reaction mixture will aid in the depolymerization thereof. Although formaldehyde is the preferred aldehyde for the process of this invention, there may be used generally the lower aliphatic aldehydes and ketones. Thus, other lower aldehydes such as acetaldehyde, propionaldehyde, isobutyraldehyde, acrolein, chloral, and methacrylaldehyde, as well as ketones such as acetone or methylethyl ketone, may be employed. In general, carbonyl compounds of the general structure:

(1) 

wherein both X and Y are hydrogen or the same or different alkyl groups, the sum of the carbon atoms in X and Y being less than 4, are preferred.

In instances where the protein derivatives described herein are difficultly soluble in acids, or whose acid solutions are of an undesirably low viscosity, these defects may often be overcome by subjecting the alkylamino protein to further treatment with additional amounts of one or more methylolamines which may be the same as or different from that used in the main reaction.

A preformed methylol derivative of the protein may be reacted with the amine. For example, zein and formalin may be heated together in aqueous alcohol solution for a period of three or four hours or may be allowed to stand at room temperature for twelve to forty-eight hours, and the formaldehyde reacts with the zein to form methylol zein. This derivative is soluble in the aqueous alcohol solution. It will then react directly with amines such as piperidine and the product obtained is the same as if methylol piperidine had been added to zein. In other cases, illustrated by Example II, all of the reactants may be added together and, in general, the materials are added to the reaction mixtures in any convenient order. Only in the case of aldehyde-sensitive proteins such as casein or gelatin is it desirable to take the precaution of adding the aldehyde after the amine or of forming an intermediate product from the aldehyde and amine. Otherwise, aldehyde hardening of the protein will probably occur.

As solvents for the reaction there may be used aqueous solutions of ethyl alcohol or methyl alcohol or any water-soluble alcohol, which solvents are particularly suitable for the prolamines such as zein and edestin. For optimum degree of amination, concentrations of 5–25% are preferred. In other cases, an aqueous solution of an excess of the amine to be used in the reaction may be employed as a solvent. As illustrated in Examples III and IX, it is not strictly necessary to use any common solvent for all of the reactants. In such instances, however, the protein should be finely ground, as to 100 mesh, in order to be sufficiently dispersed to react readily.

In the processes of this invention, proteins are customarily employed which have been purified by methods well known in the art. For example, in the case of zein from corn it is preferable to use only that portion of the corn gluten which is susbtantially soluble in 75% alcohol. However, when due allowance is made for impurities such as starch and other carbohydrates, even crude corn gluten or the alkali-soluble portion thereof may be employed in the process. In general, there may be used such a quality of protein as is commonly obtained as an article of commerce with or without further purification.

Heat may be employed to accelerate and further the reaction of the dialkylaminomethanol with a protein, but care must be taken to avoid excessive heating since this will often lead to denaturization of the protein. Ordinarily, temperatures up to 80° C. will be found satisfactory for carrying out these reactions but, in this respect, the process is limited only by the stability of the protein in question. In preparing the methylolamines, the required secondary amine is usually added to formalin with cooling. The interaction of the two materials is so rapid that cooling to room temperature aids in the operation. When all of the reactants are added to the zein solution at the same time, as in Example II, no precaution need be taken to cool the mixture, but rather the heating is started at once.

Basic catalysts such as alkali or alkali earth metal carbonates, hydroxides or oxides may or may not be used in the reaction.

The extent to which the reaction products described herein are purified will depend upon the us for which they are intended. For example, if it is desired to cast a clear film, the product is preferably clarified by filtering through a pressure filter or suitable suction filters, or it may be clarified by centrifugation. The impurities thus removed do not in any way impair the efficiency of the solution.

While mechanical agitation is normally used for carrying out this process, particularly in cases where all of the reactants are soluble in the reaction medium, such agitation is not essential but is merely a convenient means of effecting a rapid solution of the material.

From the foregoing discussion it will be apparent that the proportions of amine, "carbonyl compound" and protein may vary rather widely. In general, it is preferable to employ at least sufficient amounts of amine and "carbonyl compound" as are theoretically required to form a methylolamine. Thus, equimolecular amounts of a secondary amine of the type described and formaldehyde form a methylolamine but, in certain cases, as previously indicated, it is desirable to use an excess of amine, e. g., a sufficient amount to produce a dialkylaminomethanol. Two moles of formaldehyde react with one of amine such as monoethylamine to give dimethylolethylamine, $C_2H_5N(CH_2OH)_2$.

The proportion of methylolamine to protein is determined by the amount of amination desired in the product. Usually, an excess of methylolamine is employed over and above that required for solubilization of the protein in dilute acids. The amount of excess methylolamine employed is usually less when the mixture is heated, since the higher temperature tends to drive the reaction toward completion. The final acid-soluble products obtained from zein have a basic nitrogen content in the range 8–22%.

While it has been indicated that the products produced by the process of this invention are dried in a hot air blast and in an oven at 50° C., any method of drying which is rapid and which is carried out at a temperature below the decomposition point of the protein is considered to be within the scope of the invention. Excessive temperatures are preferably avoided, however, or the aminated protein will lose its acid-solubility.

The products described herein are generally soluble, with the formation of salts, in the stoichiometrical amount or more of dilute (e. g., 1–10%) aqueous acids, both organic and inorganic, such as acetic, propionic, lactic, nitric, hydrochloric, hydrobromic, sulfuric, tartaric, formic, succinic, malic, levulinic, phosphoric, sulfurous, and carbonic.

The products described herein may be formed into various shaped objects, in particular filaments and self-supporting films; for example, films cast from solutions of amino protein salts such as piperidyl-methyl zein acetate are clear, tough and pliable. However, the products of this invention find their most valuable application as coating compositions, which compositions may range from those which are solutions of the amino protein only in aqueous acids or certain organic solvents such as alcohols, to those which contain very small amounts of the amino protein or salts thereof. Typical of the latter are (a) aqueous emulsions of materials liquid under conditions of emulsification, such as oils and waxes, (b) aqueous dispersions of materials solid under the conditions of dispersion, such as pigments, and (c) compositions which contain both solids and liquids, the coating composition in these three instances containing the amino protein salts as dispersing and/or emulsifying agents. When these compositions are to be used for special purposes, they may contain various appropriate auxiliary agents known to the art, such as mold or mildew inhibitors, wetting agents, antioxidants, plasticizers, insecticides, adhesives, film-forming materials, thickeners, and the like.

The above compositions are very valuable for all varieties of coating, this work being used in its broadest sense to mean applications not only to impervious objects and surfaces such as metals, but also to porous or fibrous bodies such as wood, porous stone, brick, plaster, paper, paper pulp, asbestos, felt cotton, wool regenerated cellulose, etc., and articles of manufacture therefrom, such as textiles. The above coating compositions also have valuable adhesive properties and the various coated materials just mentioned may be readily glued to themselves or to one another, usually with application of heat.

Specific illustrations of the use of these coating compositions are as follows. Solutions of the amino proteins in acids may be employed as sizes for rayon tire cord to improve its adhesion to rubber, as sizes for transparent sheets of regenerated cellulose to improve the anchorage thereto of printing inks and lacquers, and as water-proof glues in the manufacture of veneers. Coating compositions which are aqueous emulsions of a wax, such as paraffin, and a fixing agent, such as aluminum acetate, having as an emulsifying agent an amino protein salt such as piperidyl-methyl zein acetate, are very valuable for sizing and water-proofing textiles and for affixing acid dyes to paper. With or without the fixing agent, these compositions may also be used for sizing paper, especially as a beater size in the manufacture of chalk-filled paper. Coating compositions which are aqueous dispersions of titanium oxide and/or other finely divided water-insoluble solid (which may be a mildew preventive such as salicylanilide), a wetting agent, a softener, and as a dispersing agent dimethylaminomethyl zein acetate or other amino protein salt, are useful for sizing and delustering fabrics and for fixing the water-insoluble solid thereto.

The process of the invention provides a simple and direct method of preparing acid-soluble polymers of very high molecular weight from relatively inexpensive commercial materials which are readily available.

Throughout the specification and claims the term "alkyl" is used to mean a radical derived from an acyclic hydrocarbon by the elimination of one atom of hydrogen such as, for example, methyl, ethyl, propyl, isopropyl, allyl, butyl, amyl, etc.

The term "amine" is used in the general and ordinary sense to include compounds derived from ammonia by substituting organic radicals for the hydrogens. The organic radicals substituted may form together a closed hydro-aromatic chain as for instance, in piperidine.

As many apparently widely different embodiments of this invention may be made without departing from the spirit and scope thereof, it is to be understood that I do not limit myself to the specific embodiments thereof except as defined in the appended claims.

I claim:

1. The process of preparing protein derivatives which comprises reacting a protein with a carbonyl compound from the class consisting of lower aliphatic aldehydes and ketones, and an amine having less than nine carbon atoms in which the amino-nitrogen is joined to at least one hydrogen atom, the remaining valences of the amino nitrogen being satisfied through single bonds by aliphatic carbon.

2. The process of preparing protein derivatives which comprises reacting a protein with a carbonyl compound of the general formula

where X and Y represent members of the group consisting of hydrogen and alkyl radicals having together less than four carbon atoms, and an amine containing less than nine carbon atoms in which the amino-nitrogen is joined to at least one hydrogen atom, the remaining valences of the amino nitrogen being satisfied through single bonds by aliphatic carbon.

3. The process of claim 2 wherein the protein is one which gives on hydrolysis a total of at least 10% of amino acids from the group consisting of aspartic acid, glutamic acid, arginine and lysine.

4. The process of claim 1 wherein the protein is chosen from the class consisting of albumins, globulins, glutelins, prolamines and phosphoproteins.

5. The process of preparing a protein derivative which comprises reacting a protein with formaldehyde and an amine having less than nine carbon atoms, in which the amino-nitrogen is joined to at least one hydrogen atom, the remaining valences of the amino nitrogen being satisfied through single bonds by aliphatic carbon.

6. The process of preparing protein derivatives which comprises reacting a protein with formaldehyde and a secondary amine having less than nine carbon atoms, in which the amino-nitrogen is joined to two aliphatic carbons and to one hydrogen atom.

7. The process of producing an acid-soluble protein derivative which comprises reacting a protein with the reaction product of formaldehyde and a secondary dialkylamine having less than nine carbon atoms.

8. The process of producing an acid-soluble protein derivative which comprises reacting together zein, formaldehyde and a secondary dialkylamine having less than nine carbon atoms.

9. The reaction products of proteins with carbonyl compounds of the class consisting of lower aliphatic aldehydes and ketones, and amines having less than nine carbon atoms, in which the amino-nitrogen is joined to at least one hydrogen atom, the remaining valences of the amino nitrogen being satisfied through single bonds by aliphatic carbon.

10. The reaction products of proteins with compounds of the general formula

where X and Y represent members of the group consisting of hydrogen and alkyl radicals having together less than four carbon atoms, and an amine containing less than nine carbon atoms in which the amino-nitrogen is joined to at least one hydrogen atom, the remaining valences of the amino nitrogen being satisfied through single bonds by aliphatic carbon.

11. The reaction products of proteins which give on hydrolysis a total of at least 10% amino acids from the group consisting of aspartic acid, glutamic acid, arginine and lysine, with a carbonyl compound from the class consisting of lower aliphatic aldehydes and ketones, and with an amine of less than nine carbon atoms in which the amino-nitrogen is joined to at least one hydrogen atom, the remaining valences of the amino nitrogen being satisfied through single bonds by aliphatic carbon.

12. The reaction product of a protein, formaldehyde, and an amine of less than nine carbon atoms in which the amino-nitrogen is joined to at least one hydrogen atom, the remaining valences of the amino nitrogen being satisfied through single bonds by aliphatic carbon.

13. The reaction product of a protein, formaldehyde, and a secondary amine of less than nine carbon atoms in which the amino-nitrogen is joined to two aliphatic carbons and to one hydrogen atom.

14. The reaction product of a protein, formaldehyde, and a secondary dialkylamine having less than nine carbon atoms.

15. The reaction product of zein, formaldehyde and a secondary dialkylamine having less than nine carbon atoms.

16. Piperidyl-methyl zein obtainable by reacting zein with methylol-piperidine, said reaction product being soluble in 1.5% acetic acid.

17. Salts of water-soluble acids and the reaction products set forth in claim 9.

18. Coating compositions comprising in effective amount solutions in dilute aqueous acids of the reaction products set forth in claim 9.

19. A coating composition comprising an aqueous vehicle and, in effective amount, an acid addition salt of a reaction product of a protein with a carbonyl compound of the class consisting of lower aliphatic aldehydes and ketones, and an amine having less than nine carbon atoms, in which the amino-nitrogen is joined to at least one hydrogen atom, the remaining valences of the amino-nitrogen being satisfied through single bonds by aliphatic carbon.

20. The reaction product of casein, formaldehyde and a secondary dialkylamine having less than nine carbon atoms.

21. Dimethylaminomethylcasein obtainable by reacting casein with methyloldimethylamine, said reaction product being soluble in 1.5% acetic acid.

FREDERICK M. MEIGS.

CERTIFICATE OF CORRECTION.

Patent No. 2,143,023. January 10, 1939.

FREDERICK M. MEIGS.

It is hereby certified that error appears in the printed specification of the above numbered patent requiring correction as follows: Page 3, second column, line 59, for the word "us" read use; page 4, first column, line 68, for "work" read word; line 73, after "wool" insert a comma; and second column, line 35, strike out "which"; page 5, second column, strike out lines 36, 37 and 38, comprising claim 18, and insert instead the following -

18. Solutions in aqueous acid of the reaction products set forth in claim 9.;

and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.